Jan. 23, 1968 B. J. BITTNER 3,365,721

CURRENT DISCONTINUITY DEVICE

Original Filed Oct. 11, 1963 3 Sheets-Sheet 1

INVENTOR.
BURT J. BITTNER
BY
Anderson, Spangler & Wymore
ATTORNEYS

INVENTOR.
BURT J. BITTNER
BY
Anderson, Spangler & Wymore
ATTORNEYS

INVENTOR.
BURT J. BITTNER
BY
Anderson, Spangler & Wymore
ATTORNEYS

Patented Jan. 23, 1968

3,365,721

CURRENT DISCONTINUITY DEVICE

Burt J. Bittner, Black Forest, Colo., assignor to Kaman Aircraft Corporation, Bloomfield, Conn., a corporation of Connecticut Continuation of application Ser. No. 315,573, Oct. 11, 1963. This application Apr. 1, 1966, Ser. No. 539,585
13 Claims. (Cl. 343—856)

This is a continuation of application Ser. No. 315,573, filed Oct. 11, 1963, now abandoned.

This invention relates to a new class of electrical components which impede the current flow in a conductor and which may be identified as current discontinuity devices.

In this age of missiles and satellites and the attendant need for effective communication between ground and remote stations and between several remote stations, good and efficient antennas are required. Further, the use of an existing portion of a remote station as an antenna would be instrumental in reducing the weight of the station. It is also important to minimize the interruption of streamlining and strength of a structure to which an electromagnetic signal is applied or coupled. To provide an effective antenna, for example, on the streamlined surface of a missile creates a problem either in disrupting the streamlining or weakening of the structural configuration. One approach suggests the excitation of only a part of the missile, however, with the present state of the art, this requires that the excited portion be electrically isolated from the balance of the structure or that a slot antenna be used. Either of these solutions requires that the structure be physically interrupted and weakened.

The device of this invention provides a novel means of the coupling of electromagnetic energy to and from transmission lines, antenna elements and large structures which conveniently cannot physically be altered to provide an electrical discontinuity.

It is an object of the present invention to provide a current discontinuity device which overcomes certain disadvantages of prior art devices.

It is a further important object of the present invention to provide a current discontinuity device which may be applied to an existing structure without disrupting the electrical continuity thereof.

Another important object of the present invention is to provide a means for coupling to a portion of a structure of significant size without structurally or electrically isolating a portion of the structure.

Another object of the present invention is to provide a current discontinuity device having broad band characteristics.

A still further object of the present invention is to provide means for producing broad band arrays which are tunable without disrupting the electrical continuity thereof.

Another and further object of the present invention is to provide a current discontinuity device which is simple of construction, inexpensive to manufacture and effective in operation.

For a better understanding of the present invention, together with other and further objects thereof, reference is had to the following description taken in connection with the accompanying drawing and its scope will be pointed out in the appended claims.

Figures 1, 2, 3, 4:
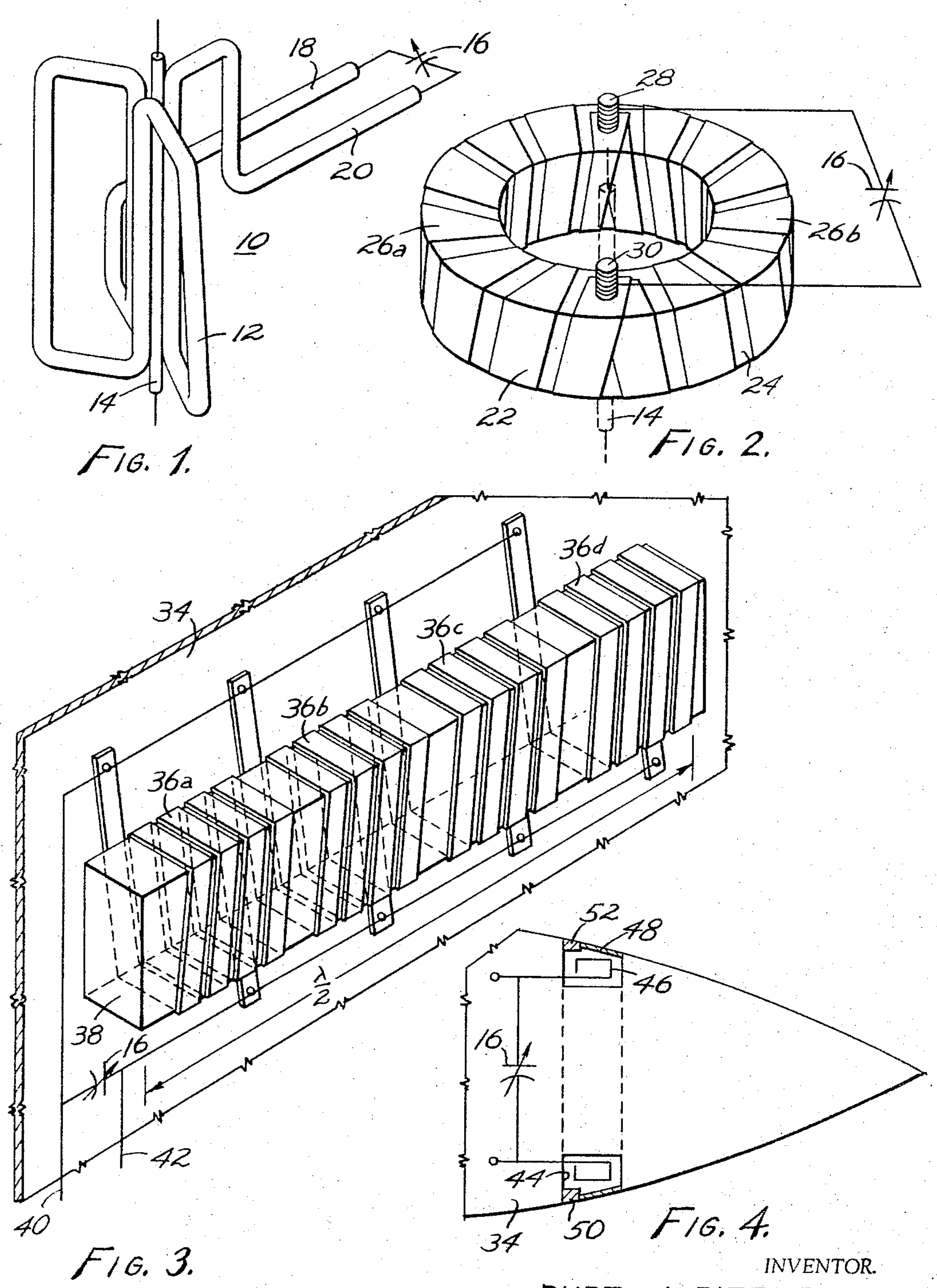
FIGURE 1 illustrates a basic form of the invention.
FIGURE 2 illustrates a counterwound configuration of the invention.
FIGURE 3 illustrates a further embodiment of the invention wherein a series of turns are parallel to provide a desired characteristic.
FIGURE 4 shows the invention as applied to a large structure.

Referring now to the drawings, and in particular to FIGURE 1, the current discontinuity device 10 of the present invention in its simplest form is comprised of a plurality of formed coupling loops 12 of an electric conductor, series connected and a portion of which lies in close parallel relation to a transmission line or conductor 14 to provide a high order of coupling between the coil and the transmission line. The loops in the device of FIGURE 1 are formed in the shape of a toroid and the loops are preferably resonant at operating frequencies. The current discontinuity device is open-ended to direct current flow and may be self-resonating or may include a circuit element such as capacitor 16 connected to terminals 18 and 20 to achieve resonance. The value of the capacitor and the number of turns will vary depending upon the frequency, the desired coupling coefficient and the distributed capacity between the turns. The device acts to impede the current flow at resonance by the magnetostatic force on a moving charge due to the closely coupled electrons in the associated loops. For greatest coupling efficiency on the order of at least 90% a portion of each loop should lie in close parallel spaced relation to the conductor of not more than about 0.005 of the operating wavelength. The parallel portion may be small compared to the frequency wavelength to be coupled and the length of the coil should be small when compared to the wavelength or multiples thereof.

As an active coupling device, a high impedance feed at resonant frequency is available across terminals 18 and 20. A low impedance feed at resonant frequency is available by tapping down on the loops as by having the terminals across fewer turns. The basic uses of the configuration of FIGURE 1 are as a wave trap on an antenna structure and as a band-reject filter in a coaxial line. The center conductor is thus seen to be structurally undisturbed and yet provides 90% and better effective coupling and enclosing of the magnetic field.

Where it is desirable to couple to a conductor of such a size that the total length of coupling elements required to surround the conductor being to approach self-resonance, a parallel connected counter-wound configuration of the coupling loops may be used as in FIGURE 2. Here, the conductors 22 forming the loops may be flat ribbon wound on an insulating coil form 24 which may be of plastic and the like. The coil 26 is made up of two counter-wound sections 26*a* and 26*b* being connected in parallel as at terminals 28 and 30 and the length of each section is not greater than that providing self-resonance at the operating frequency. A capacitor 16 may be connected across terminals 28 and 30 for tuning purposes. This configuration provides maximum separation of the feed terminals which is desirable in some high power applications.

Thus, it is seen that the current discontinuity device may be used around a structure of considerable size by paralleling many coil sections each of a length not greater than that providing self-resonance at the operating frequency. An embodiment of this arrangement is shown in FIGURES 3 and 4. By paralleling many sections, a structure, such as a missile 34, with a circumference or dimension greater than a wavelength can be properly excited. In this case, as in the application to smaller structures, the current discontinuity device is a means for feeding the structure as well as being a means of providing a parasitically excited system.

With particular reference to FIGURE 3, it has been discovered that the surface to be excited need not be a figure of revolution and thus a linear section of a missile or aircraft 34 can be excited by a flat coil arrangement 36 arranged about an insulating form 38. Each coil 36*a*, 36*b*, 36*c* and 36*d* is connected in parallel with the other and the coils are insulated from the missile 34 as by a layer of insulation. The coils 36 are connected to a generator (not shown) via conductors 40 and 42 connected respectively to the ends of the coils. While the length of the coil arrangement 36 is preferably a half-wavelength at the operating frequency for greatest efficiency, the length can be less than a half-wavelength or several wavelengths in length so long as the individual coils 36*a*, 36*b*, 36*c*, etc., are each effective half-wavelengths at the operating frequency. For greatest coupling efficiency, a plurality of coil arrangements of FIGURE 3 sufficient to encircle or extend the length of the body to be driven and dimensioned or tuned to a half-wavelength of the operating frequency would be connected in series-parallel.

The missile 34 of FIGURE 4 is provided with an annular recess 44 within which is positioned a plurality of coils 46 connected in parallel, as in FIGURE 3, to be driven in phase, to excite a portion of the missile without the necessity of structurally or electrically isolating same from the balance of the missile structure. The coils 46 are electrically insulated from the missile. The annular recess 44 and flap 48 define an electrostatic shield around the coil and serve to protect the structure and provide effective coupling to the missile. The flap 48 extends from one side of the annular recess to just short of the other side to define cover having a gap or split 50 along one edge. Split 50 may be filled with an insulator 52 to maintain the streamlined profile. The coils 46 comprise a plurality of parallel connected coils much in the manner of the coils 36 in FIGURE 3. The missile structure 34 is capable of thus being excited by an isolated small feed at current points. The provision of a shield produces close coupling between the current discontinuity device and the structure being driven. Through the use of a split shield a reduction in the size of coil can be made while maintaining a sufficient degree of coupling. The current discontinuity device effectively isolates one portion of the missile from another for purposes of its use as an antenna. Similarly, portions of aircraft, buildings and even mountains and islands can be energized, actively or passively, as an antenna.

Figure 5B:
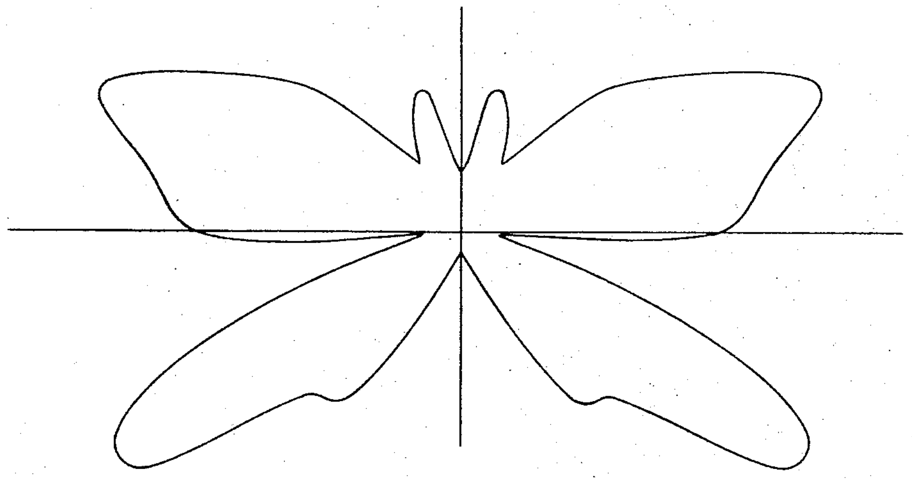
FIGURES 5B and 5C are representations of radiation patterns of the antenna array of FIGURE 5A, FIGURE 5B being the pattern obtained without and FIGURE 5C being the pattern obtained with the current discontinuity device of this invention.
Figure 5C:
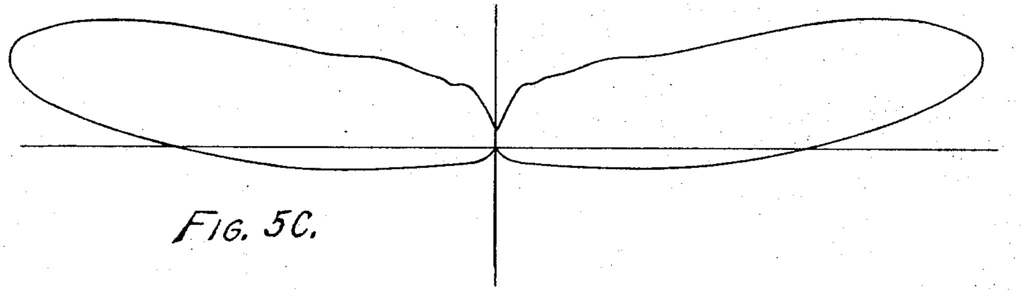
Figure 5A:
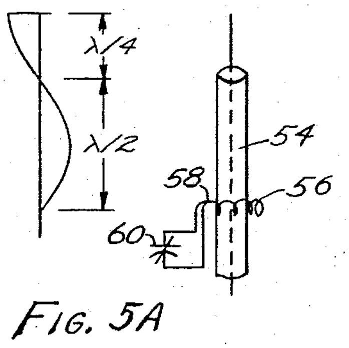

Referring to FIGURE 5, there is represented radiation patterns of an antenna array 54, FIGURE 5A, about which a passive current discontinuity device 56 is positioned. Device 56 consists of a toroid coil 58 having a variable capacitor 60 connected thereacross. The patterns of FIGURE 5B represents that obtained from antenna 54 less the current discontinuity device 56 or with same detuned from resonance at the frequency being transmitted. FIGURE 5B shows a pattern with multiple lobes and is lacking in controlled directivity. On the other hand, the pattern of FIGURE 5C represents the radiation obtained from antenna 54 wherein the current discontinuity device is in place and tuned to resonance with the frequency being transmitted. The pattern obtained is essentially the familiar and desired FIGURE 8 pattern which provides directivity and gain in a desired direction. It is to be noted that the device of the present invention functions as a wave trap when placed at a desired current maximum as opposed to parallel resonant wave traps which must be placed at a voltage maximum and in the line or antenna The present devices are also seen to differ from the parallel resonant wave trap in that at frequencies off-resonance it does not disturb the transmission line measurably and further can be repositioned by being slid along the line to a desired point.

Figure 6:
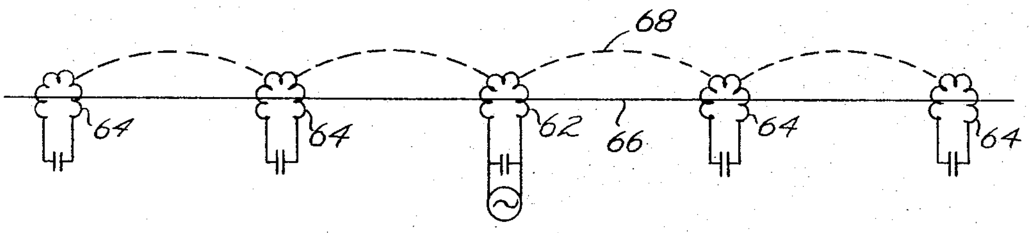
FIGURE 6 illustrates the use of the current discontinuity devices of the present invention to produce a tuned array from a long conductor.

FIGURE 6 illustrates another embodiment wherein the current discontinuity devices according to the present invention are utilized in both active 62 and passive 64 forms. The devices are positioned along the length of a long wire 66 to provide an array tuner. The active device 62 is positioned centrally of wire 66 and a plurality of passive devices 64 are positioned along the length of the wire at points where current discontinuity is desired usually spaced as a function of the wave length of the frequencies being fed to the array. The dotted lines 68 represent the plot of voltage (standing wave) along the line. The devices of this invention are installed over the wire and avoid physically breaking into the wire as is required in following known practices where wave traps are inserted in the wire and are structurally difficult and expensive to use.

Figures 7, 8, 9, 10, 11, 12, 13:
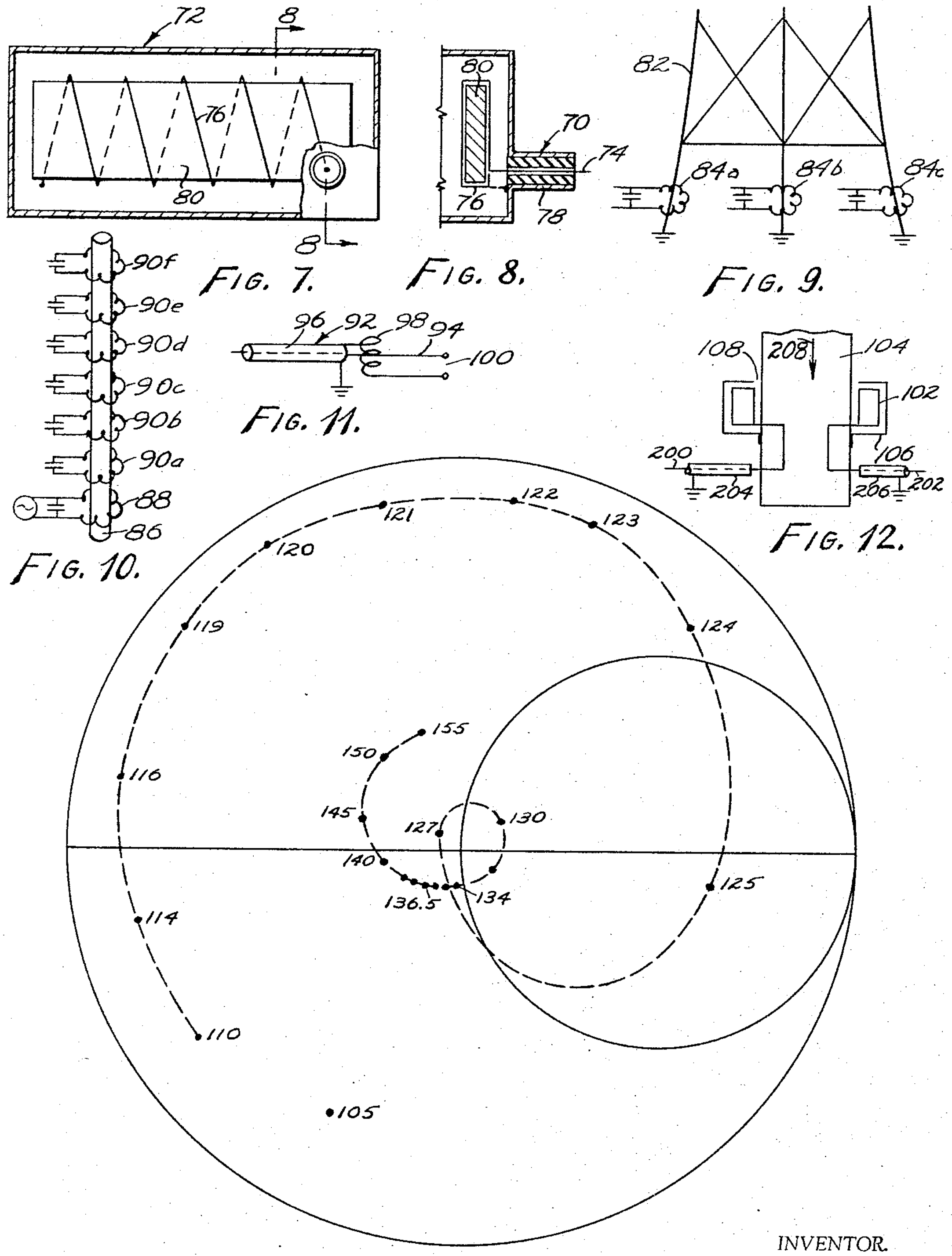
FIGURES 7 and 8 illustrate an embodiment of the current discontinuity device of the present invention for coupling a coaxial cable to a wave guide.
FIGURE 9 illustrates the use of the present invention to couple electromagnetic energy to a multi-pedestal antenna.
FIGURE 10 illustrates the use of a plurality of devices according to the present invention to provide a multiple frequency capability.
FIGURE 11 illustrates another embodiment of the present invention to provide impedance matching between circuits.
FIGURE 12 illustrates another form which the invention may take wherein the coils are shielded; and, FIGURE 13 represents a plot of admittance of a specific device according to the invention.

FIGURES 7 and 8 illustrate the use of the device of this invention to provide a coupling between a coaxial cable 70 and a wave guide 72. It will be seen that the center conductor 74 of the coaxial cable is connected to one end of coil 76, the other end of which is connected to the wave guide 72. The shield 78 of the coaxial cable is also connected to wave guide 72. The coil 76 is preferably wound about an insulated form 80 in the same manner as that of coil 36 in FIGURE 3 and the coil may be counter-wound as in FIGURE 2.

FIGURE 9 shows an antenna tower 82 with parts broken away to conserve space, with a current discontinuity device 84*a*, 84*b* and 84*c* about each leg. The devices 84*a*, 84*b* and 84*c* are connected in parallel and driven in phase to effectively provide isolation from ground and avoid the necessity of the use of heavy insulators. This arrangement further permits tower 82 to be grounded directly for lightning protection. The devices 84*a*, *b* and *c* should be resonant at the transmission frequency and multiple units would be used where more than one frequency is encountered.

An alternate feed arrangement may be utilized where devices 84*a*, *b* and *c* are passive, parasitically excited and the energy is coupled to antenna tower 82 above the positioning of devices 84*a*, *b* and *c*.

FIGURE 10 illustrates an antenna 86 with portion broken away to conserve space, on which is positioned a driven current discontinuity device 88 and a plurality of passive devices 90*a*, *b*, *c*, *d*, *e* and *f* to provide a broad tuned array. Device 88 is chosen to be resonant at a selected frequency within the spectrum of frequencies to be transmitted or received by the antenna 86. The passive devices 90*a*, *b*, *c*, *d*, *e* and *f* are positioned immediately adjacent each other along the antenna and are mutually coupled. Devices 90*a*, *b*, *c*, *d*, *e* and *f* are each chosen to be resonant at a different frequency. The paratisitic devices 90*a*, *b*, *c*, *d*, *e* and *f* are spaced from driven device 88 by an even fraction of a wavelength of the frequency at which they resonate, such as a half wavelength. The proximity of the devices provides a coupling from one device to the next until the particular device resonant at the desired frequency is reached. This arrangement provides an antenna which is efficient in use with multiple frequencies encompassing a considerable bandwith.

FIGURE 11 shows a device of the invention as used in an impedance matching device in the nature of a balun coil to match a low impedance line, such as a co-axial cable 92 with a high impedance. The center conductor 94 of the cable is intact throughout its length and has a portion extending beyond the shield 96. A toroidal coil 98 is shown positioned around the unshielded center conductor 94 with one end thereof being connected to the shield 96. The other end of coil 98 along with the unshielded center conductor comprise the high impedance terminals 100 of the device. The coil 98 can also be successfully positioned about the outer shield.

FIGURE 12 illustrates another embodiment of the invention for use as a directional coupling with parts broken away to conserve space. The toroidal coil 102 is positioned externally of a large diameter antenna 104. The coils are surrounded by a split shield 106. The split 108 between one margin of shield 106 and antenna 104 may be filled with an insulator material for weatherproofing purposes. The ends of coil 102 are each connected to center conductor 200 and 202 of coaxial cables 204 and 206 which may be connected together through an impedance, such as a tuned capacitor, and associated active circuitry, such as vacuum tube amplifiers and varactors, or the cables may be fed to independent circuits. Electromagnetic energy from the direction of the arrow 208 will produce signals between the center conductors and outer shields of a different phase and magnitude that signals from a direction opposite from the direction of arrow 208, thus permit either directional transmission or a determination of the direction of a recovered signal as a function of the phase and magnitude of the signals available across cables 204 and 206.

FIGURE 13 represents the plot of admittance of a specific tunable current discontinuity band reject, band pass filter design tested in an NBS tracking station having coil portions parallel with the conductor for a distance as small as 0.1 of the wavelength and being spaced therefrom on the order of .0002 wavelength to provide coupling substantially in excess of 90% on the order of 99.9%. The circuit configuration is essentially that of FIGURE 1 utilizing a multiple grouping in series parallel. As a simple band reject filter, it was matched (VSWR<1.1) from DC through 115 mc. and from 113 mc. through to over 300 mc. The reject notch was tunable from 5 mc. to 256 mc. and was set at 121 mc. for these tests. The theoretical analysis of the devices indicate that there are no transcendental, or harmonically related spurious response characteristics of significance.

While there have been described what at present are considered to be the preferred embodiments of this invention, it will be obvious to those skilled in the art that various changes and modifications may be made therein without departing from the invention and it is to be understood that all matter herein is to be interpreted as being illustrative and not by way of limitation. It is aimed, therefore, in the appended claims to cover all such changes and modifications which fall within the true spirit and scope of the invention.

What is claimed is:

1. A current discontinuity device comprising in combination, an elongated multiple loop D.C. open-ended coil of a conductor having a lineal length providing an effective electrical half-wavelength at the frequency with which it is to be used, said coil having a non-magnetic core and another electrical conductor electrically isolated from said coil wherein a substantial portion of each loop of the coil lies in such close coupled parallel relation to the other conductor and in such immediate proximity to other conductor for substantial distance which is small compared to the wavelength of the frequency with which it is to be used as to provide coupling on the order of at least 90% between said coil and said other conductor.

2. The current discontinuity device according to claim 1 wherein the multiple loop coil is of toroidal configuration completely surrounding a conductor in close coupled relation.

3. A current discontinuity device which comprises a plurality of multiple loop coils of claim 1 connected in series-parallel relation.

4. A current discontinuity device comprising in combination, a multiple loop coil having a non-magnetic core connected in series with a capacitor and a conductor electrically isolated from said coil wherein a portion of each loop lies in close parallel relation to the conductor and includes an electrostatic split-shield surrounding the coil with said shield being in electrical continuity with the conductor.

5. A current discontinuity device according to claim 4 wherein the coil includes a plurality of multiple loops connected in series-parallel relation and the conductor is of planar configuration.

6. A current discontinuity device according to claim 4 wherein the coil includes a plurality of multiple loops formed in a toroidal configuration concentric with the conductor, said loops being connected in series-parallel relation and the conductor is of circular cross-section.

7. A current discontinuity device comprising in combination, a plurality of elongated multiple loop coils each of toroidal configuration having a non-magnetic core, a capacitor in series with each coil, each coil being formed of a conductor having a lineal length providing an effective electrical half-wavelength at the operating frequency and another conductor electrically isolated from said coils wherein the coils are mounted in concentric relation about the other conductor in spaced relation along the length thereof at positions where current discontinuity is desired and wherein a portion of each loop of a coil lies in such close parallel relation to the other conductor for a substantial distance which is small compared to the wavelength of the operating frequency as to provide coupling on the order of at least 90% between said coils and said other conductor.

8. A current discontinuity device in accordance with claim 7 wherein each coil and capacitor pair resonate at progressively different frequencies.

9. A current discontinuity device comprising in combination, a plurality of elongated multiple loop coils of toroidal configuration having a non-magnetic core, each coil connected in series with a capacitor and in parallel with each other, each coil being formed of a conductor having a lineal length providing an effective half-wavelength at the operating frequency and another conductor electrically isolated from said coils, at least a portion of said other conductor enclosed in concentric relation by a coil and wherein a portion of each loop of a coil lies in such close parallel relation to the other conductor for a substantial distance which is small compared to the wavelength of the operating frequency as to provide coupling between said coils and said other conductor on the order of at least 90%.

10. A current discontinuity device according to claim 9 wherein each coil is enclosed by an electrostatic split shield which is in electrical continuity with the other conductor enclosed by said coils.

11. A current discontinuity device comprising in combination, an elongated multiple loop D.C. open-ended coil having a non-magnetic core and an electrical conductor electrically isolated from said coil wherein a portion of each loop lies in close parallel relation and in immediate proximity to the conductor for a substantial distance which is small compared to the wave length of the frequency with which it is be used, the length of the coil is small when compared to such wave length and wherein the device includes an electrostatic split-shield surrounding the coil with the shield being in electrical continuity with the conductor and a device is positioned along the conductor where a current discontinuity is desired.

12. A current discontinuity device comprising in combination, an elongated multiple loop coil with a non-magnetic core, said coil being connected in series with a capacitor to provide an effective electrical half-wavelength at the operating frequency and a conductor electrically isolated from said coil wherein a portion of each loop lies in close spaced parallel relation to said conductor wherein the spacing between said portion of each loop and said conductor is selected to provide electrical coupling of at least 90% therebetween and the total length of the coil is small compared to a whole wavelength.

13. In an antenna connected to ground potential, a current discontinuity device positioned intermediate ground potential and a drive connection thereto, which device comprises an elongated multiple loop D.C. open-ended coil of a conductor having a lineal length providing an effective electrical half-wavelength at the frequency to be used therewith, said coil having a non-magnetic core and being electrically isolated from said antenna and wherein a substantial portion of each loop of the coil lies in such close coupled parallel relation to the antenna and in such immediate proximity thereto for a substantial distance which is small compared to the wavelength of the operating frequency so as to provide electrical coupling between said coil and said conductor on the order of at least 90%.

References Cited

UNITED STATES PATENTS

| | | | |
|---|---|---|---|
| 2,159,648 | 5/1939 | Alford | 333—73 |
| 2,283,670 | 5/1942 | Evans | 336—174 |
| 2,296,356 | 9/1942 | Lindenblad | 336—174 |
| 2,527,609 | 10/1950 | Willoughby | 333—77 |
| 2,611,080 | 9/1952 | Brough | 333—18 |

FOREIGN PATENTS

| | | |
|---|---|---|
| 338,982 | 12/1930 | Great Britain. |

HERMAN KARL SAALBACH, *Primary Examiner.*

R. F. HUNT, M. NUSSBAUM, *Assistant Examiners.*